United States Patent [19]
Milliser et al.

[11] 3,957,148
[45] May 18, 1976

[54] LOGICAL SOLUTION FOR MECHANICAL CLUTCH START/STOP WEAR

[75] Inventors: Charles E. Milliser; David N. Sitter, both of Waynesboro, Va.

[73] Assignee: General Electric Company, Waynesboro, Va.

[22] Filed: Dec. 26, 1973

[21] Appl. No.: 427,657

[52] U.S. Cl.............................. 197/1 R; 235/92 SH; 340/172.5
[51] Int. Cl.².......................................... B41J 27/00
[58] Field of Search............. 197/1 R, 19; 340/172.5; 178/23 R, 30; 235/61.9 R, 92 SH, 91 PR

[56] References Cited
UNITED STATES PATENTS

| | | | |
|---|---|---|---|
| 3,703,949 | 11/1972 | Howard et al. | 197/1 R |
| 3,710,913 | 1/1973 | Brennan et al. | 197/1 R X |
| 3,812,466 | 5/1974 | Rich | 197/1 R X |
| 3,814,011 | 6/1974 | Kashio | 197/1 R X |

*Primary Examiner*—Ralph T. Rader
*Attorney, Agent, or Firm*—Michael Masnik

[57] ABSTRACT

A mechanism to limit the starting and stopping movement of a print head in a printing operation comprising moving a plurality of character representing signals in memory from a source to the printing operation at a rate in excess of the rate at which characters are normally available from the source such that a substantial number of characters are printed along a line on a record medium before the memory storing the character signals is empty of the initially stored character signals and the additional character signals received during the printing operation. Overrides are provided depending on the frequency of data received from the source and the appearance of a control code in memory.

29 Claims, 7 Drawing Figures

LOGICAL SOLUTION FOR MECHANICAL CLUTCH START/STOP WEAR

The present invention relates to printers and more particularly to a method and apparatus for controlling the rate of printing by a serial printer.

Serial printers, such as dot matrix printers are well known in the prior art. A fairly common type of such printer involves a plurality of print wires or styli which are arranged in a vertical line. These wires are maintained in a spaced apart arrangement in a print head. The head is supported on a carriage which in turn is caused to traverse a line of movement across a record medium. A common type of dot pattern involves a five by seven matrix. As the carriage shifts the print head through successive columns across a line of movement on the record medum, a five by seven dot pattern of alphanumeric characters is produced on the record medium by selective displacement or extension of the individual print wires in their successive column positions for impacting the record medium through the inked ribbon.

In one type of printer the print head is moved at a constant rate of speed through five successive dot matrix positions and then stops. This process of stop-and-go operation of the print head is accomplished by the use of the motor drive acting through a selectively operable clutch mechanism for communicating driving power to the print head carriage. This stop-and-go operation for each character causes excessive wear of the clutch and driving mechanism and results in objectionable levels of noise. It also has the disadvantage of causing relatively slow printing. Another type of printer commonly referred to as a line printer has the ability to store in memory a full line of characters. The entire print head assembly is moved continuously across a full line on the record medium at a constant rate of speed under the control of a motor and clutch mechanism. At the end of the line the clutch is automatically operated to enable the print head to return to its initial column position but on a following line for printing the next line of stored information. The disadvantage of the line printer is the fact that it needs large memory capacity which results in higher cost and greater size. These and other objections experienced with prior art devices are overcome by the present invention.

It is, therefore, an object of this invention to provide an improved printing mechanism.

It is another object of this invention to provide an improved printer of balanced cost and speed advantages.

Another object of this invention is to provide an improved arrangement for controlling print head movement along a line of movement across a record medium.

A further object of this invention is to provide an improved printer which can print serially a character at a time with pauses to enable print viewing or to continuously print a plurality of characters serially at a given rate.

In accordance with one aspect of the invention, there is provided a printer for connection to a source of printable and control character signals which signals are normally available at a first rate. The printer includes provisions for storing three characters before releasing the signals to effect character printing or to execute control functions represented by such signals, such as carriage return, line feed, etc. The object of storing three characters is to limit the starting and stopping movements of the print head during the printing operation. Once printable character signals are released, the mechanism continues to print until all such character signals stored and all such character signals received in the interim are printed. The mechanism printing rate is designed to exceed the rate at which characters are normally available or received from a source, the percentage of the difference determining the number of characters printed before the mechanism must stop for lack of characters to print. In one embodiment where the printing rate exceeded the character signal receive rate by 10 percent, then for every character signal printed only nine-tenths of the time required for a character signal to be received would have elapsed. This means that approximately 30 characters are printed before the buffer or memory storing the character signals is empty of the initial three character signals and the additional character signals received during this period. This substantially reduces the wear of stopping and starting the print head mechanism. Several overrides are employed. The first is when the data received from the data source does not come to an exact multiple of three. In this case the data is held for a predetermined period of time, approximately 120 milliseconds in one particular embodiment, and then printed. This same delay is used to allow the typist to see the characters already printed by halting print head movement for this period of time. Secondly, any time a control code or delete code appears in the memory or register control circuitry as the next character to be printed, the mechanism will stop. After the control code is processed or delete discarded, the mechanical halt is released. If three character signals are received or the predetermined period of time delay has elapsed, the mechanism will begin movement and printing again.

While the specification concludes with claims particularly pointing out and distinctly claiming the subject matter which is regarded as the invention, an illustration of several particular embodiments can be seen by referring to the specification in connection with the accompanying drawings in which:

FIGS. 5A, B and C illustrate graphically the functioning of the logic circuits to control receipt, storage and utilization of data.

Figure 1:
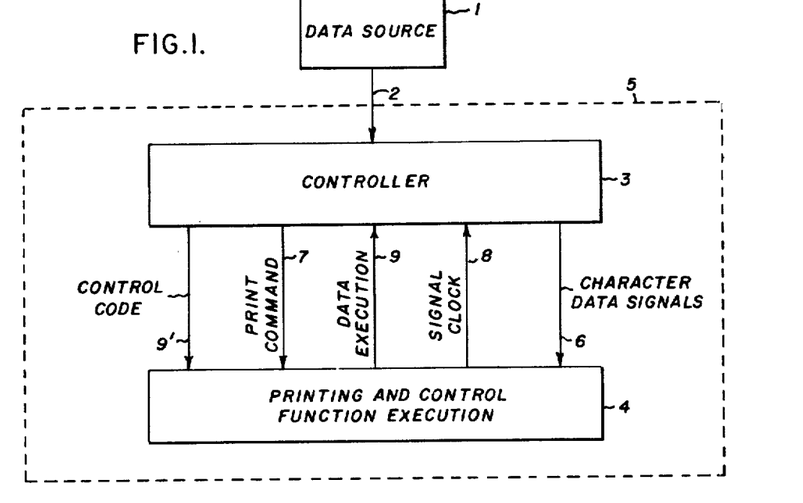
FIGS. 1 and 2 are combination block and schematic diagrams of a generalized printer embodying the present invention.

Referring to FIG. 1 there is shown, in block diagram form, a generalized printer arrangement useful in explaining the present invention. Data available from a source, such as a keyboard, tape reader or data line, comprises printable character signals and control character signals. In a typical 300 baud type printer the character representing signals would appear at a 33 millisecond interval. The data is available in digital form over lead 2 at the controller portion of the printer arrangement. For purposes of illustration the data will be defined in terms of a 7 bit code, that is, the character is uniquely defined by one of two binary logic states in each of the 7 bit positions. The significance of this will become more apparent during the discussion of the digital logic system to be described for carrying out the particular functions of the invention. In this system there are two distinct signal levels. One of these signal levels will be referred to hereinafter as logic 1 and may be represented by a voltage such as −5 volts. The other logic level will be referred to as logic 0 and will be represented by a lower voltage, such as 0 volts. Binary coded data is applied over lead 2 to the controller portion 3 of printer 5 in bit serial, character serial form. Throughout the specification reference is made to a lead. This is intended to mean either a single or a plurality of connections depending on whether a data signal involves a single or a plurality of signal components. An example of the latter is data in bit parallel format. The controller 3 is shown to include a number of interconnections with the printing and control function execution portion 4. As shown, signals representing printable character and control function characters are supplied over lead 6 to block 4 which responds by printing characters or executing control functions. Printing of characters is controlled by a print command signal applied over lead 7, execution of control functions is controlled by the control code signals applied over lead 9'. Data executed signals applied over lead 9 indicate the printer had responded by printing or executing the control functions. System clock signals over 8 correlate the timing of functions carried out in 3 and 4.

Figure 2:
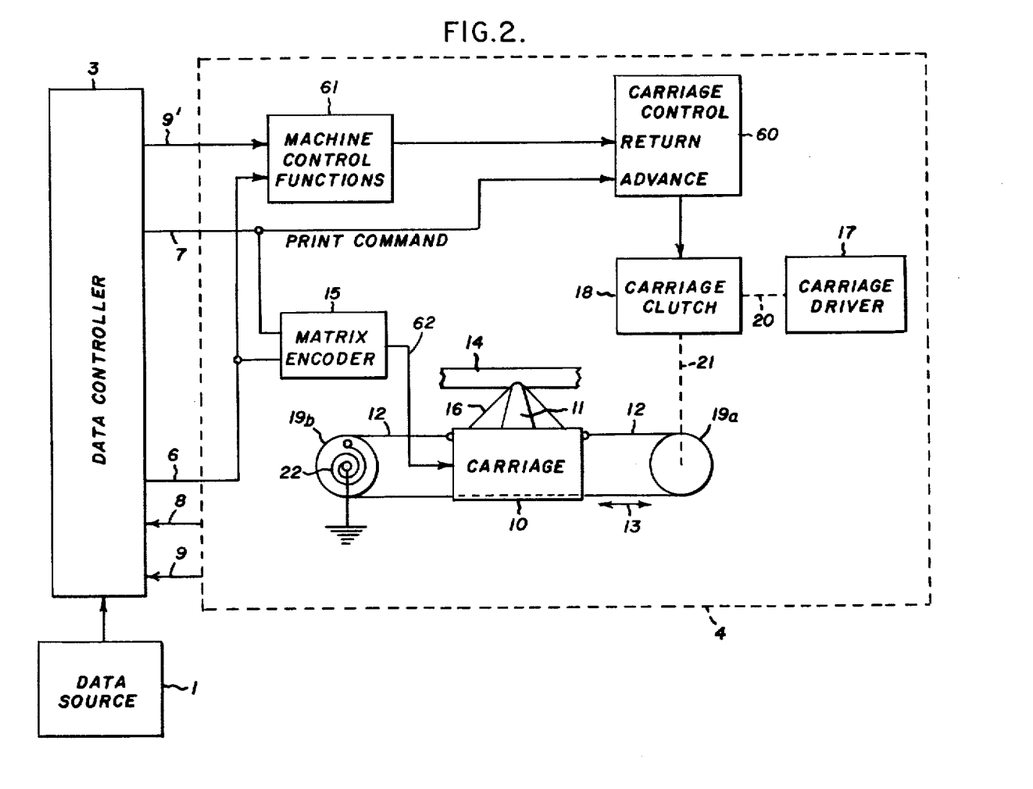
Figures 3, 4:
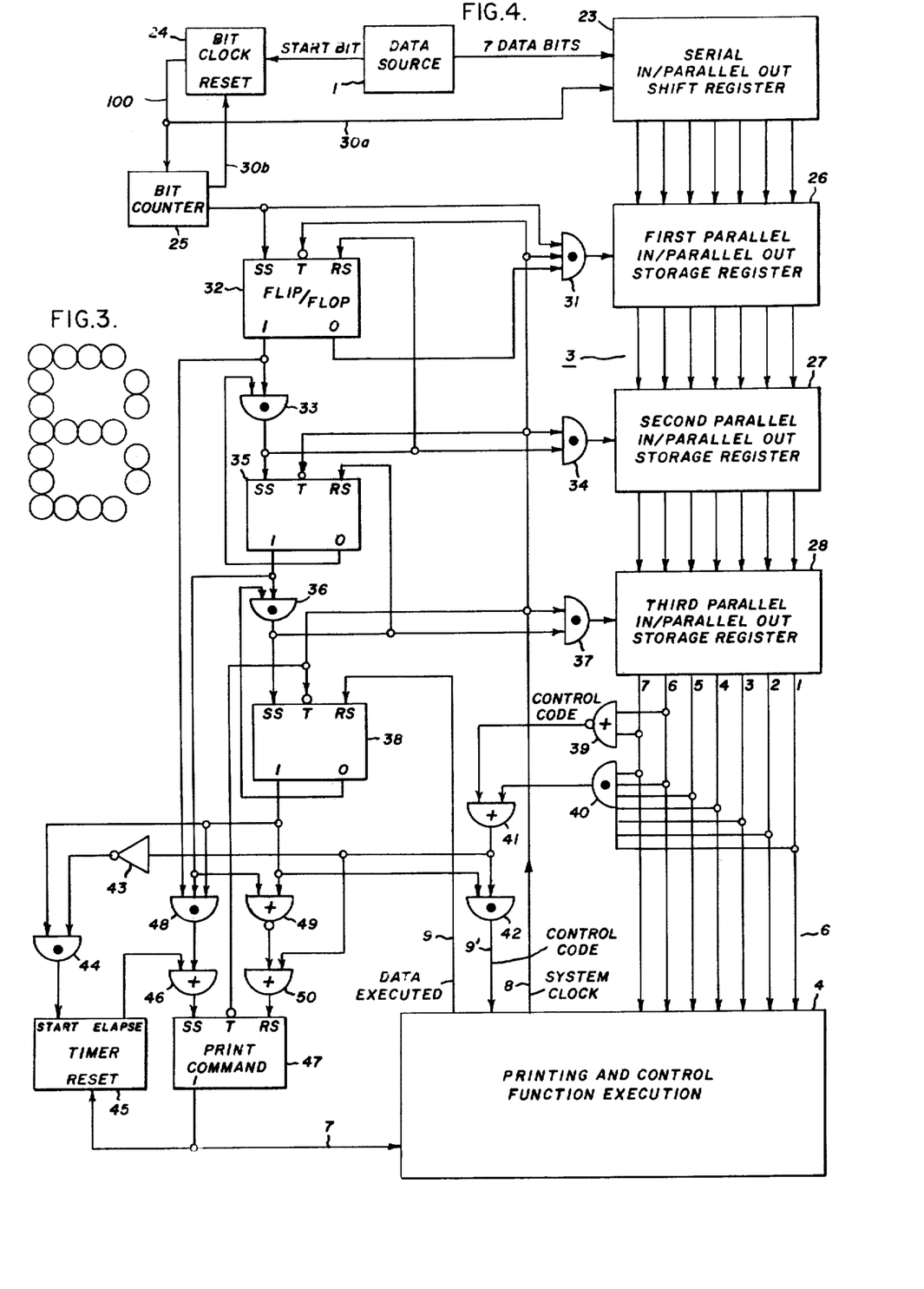
FIG. 3 illustrates a typical printing of a character in dot matrix format.
FIG. 4 is a combination block and logic diagram of a detailed embodiment of a printer comprising the present invention.

Essentially, controller 3 comprises in one preferred embodiment a memory in the form of shift registers. The memory stores a selected number of character representing signals such as, for example, three character signals in the present illustration — before the signals are released in sequence over lead 6 for printing or execution of the control functions represented by the signals. Referring to FIG. 2, if we consider the printing function initially, then a signal is furnished over lead 7 to a carriage control mechanism 60 to cause a printing head to move along a line on a record medium. This is illustrated by a carriage 10 carrying a print head 11. The carriage is driven by a mechanical connection 12, to be described, in the direction of the arrows to traverse a line of movement across a record medium 14. In the particular embodiment shown print head 11 comprises a series of 7 printing needles of styli arranged vertically and selectively operated under the control of signals available from 15 so as to be extended to or retracted from the record medium 14. Matrix encoder is any well known circuit for responding to character signals over lead 6 and a print command signal over lead 7 for converting the ASCII code formatted character signals to a 5 by 7 matrix code. Upon being extended, the needles impact onto the record medium through an inked ribbon 16 to produce a vertical dot pattern. As the carriage moves, after having been enabled by a print command 7 applied to 60, along the line of movement on the record medium, the needles are selectively operated in response to signals over 62 during each of the five column positions associated with any character to generate a dot pattern of that character. FIG. 3 illustrates one such dot pattern tracing out the character B.

The manner in which the needles are selectively operated in each of the column positions and along the entire line of print forms no part of this invention. Various well known techniques are available to accomplish this purpose. For example, in one application the pattern of needle movement is controlled by a matrix encoder and the placement of the pattern element by a shutter mechanism associated with the column movement of the carriage as it moves across a line on the record medium. Under the circumstances described, once the carriage is released for movement across a line of type on the record medium, the printer continues to print until all characters stored in the printable 3 character memory and all characters received in the interim are printed. The mechanism printing rate is designed to exceed the received character rate of 33 milliseconds by some 10 percent. This determines the number of characters written before the mechanism must stop for lack of characters to print. If the print rate exceeds the receive rate by 10 percent, then for every character printed only nine-tenths of the time required for a character to be received has elapsed. This means that approximately 30 characters must be printed before the memory or buffer is empty of the initial 3 characters and the additional characters received during this period. It is obvious that this drastically reduces the wear of stopping and starting the mechanism. The starting and stopping is controlled by the controller output signals available on lead 7. The driving means 17, such as a motor, normally drives the mechanical linkage 12 through a clutch 18 and a pulley 19a. In this particular embodiment when printing is to take place, the clutch is operated by 60 in response to signals available on 7 to couple a driving force from the driving means 17 over linkages 20 and 21 to the shaft of pulley 19a. Carriage 10 has attached to it one end of a linkage such as a belt 12. Linkage 12 has its ends connected to carriage 10 and being wrapped around driving pulley 19a and around return pulley 19b. Under these circumstances the carriage is caused to move from the start of the line of printing to the end of the line of printing on the record medium. When the end of the line is reached, clutch 18 is operated by 60 in response to a signal applied over lead 7 to disconnect the further means from driving the carriage and a return mechanism such as a wrap spring 22 is enabled to return the carriage swiftly to the start of line position for printing the next line. Signals available in the form of line feed signals cause the paper to advance to the next line in any well-known manner forming no part of this invention, for printing to resume. Under the circumstances described, several overrides are provided. The first is when the data group received by the controller 3 from the data source does not fill the 3 character register, for example, if it does not come to an exact multiple of three characters. In this case the data is held for a predetermined period of time, approximately 120 milliseconds in one particular embodiment, and then printed. The same delay is used to allow the typist to see his or her work by hesitating for this time. Secondly, any time a control code or delete code is seen by the controller's memory or shift register as the next character to be printed or executed, the mechanism for moving the print head across the record medium is stopped. After the control code is processed or the delete discarded, the print head is permitted to continue its travel across the record medium. If three characters are received or the time-out of the delay period occurs, the mechanism will begin printing again. This and other features of the present invention will be explained in greater detail later.

Before discussing one preferred embodiment of the invention as illustrated in FIG. 4, it will be helpful to set forth a few preliminary remarks concerning digital logic systems.

As previously mentioned, the present logic system involves binary signals in which there are two distinct levels. One of these signal levels will be referred to hereinafter as logic 1 and the other logic level will be referred to as logic 0. These are represented by two different voltages. Generally speaking, the data available from the source not only includes a start bit in the zero bit position but a parity bit in the eighth bit position and a stop bit in thee ninth position. Circuitry exists for separating out these various bits to effect the related control functions.

The logic element denoted with reference numeral 34 in FIG. 4 is a simple AND gate. AND gate 34 may have any number of inputs (designated by the arrows). The operation of AND gate 34 is such that its output will go to logic 1 if and only if all the inputs are at logic 1. Under all other input conditions, the output of the AND gate will be logic 0.

The logic symbol denoted with reference numeral 43 is a simple inverter. As is well known, inverter 43 operates such that its output (denoted by the circle) will be a logic 1 when its input (denoted by the arrow) is a logic 0 and vice versa.

The logic symbol denoted with reference numeral 32 is a simple steered flip-flop. It has three input terminals labeled SS, RS and T. The SS input terminal is the set steering input, the RS terminal is the reset steering input and the T input terminal is the trigger terminal. A logic 1 on the SS input terminal followed by a signal going to logic 0 (as indicated by the circle) on the T input terminal will cause flip-flop 32 to assume the set state. Similarly, a logic 1 on the RS input terminal followed by a signal going to logic 0 on the T input terminal causes flip-flop 32 to assume the reset state. The present state of flip-flop 32 is indicated by its two output terminals labeled 1 and 0. These labels are used to indicate the logic signal present at these outputs when flip-flop 32 is in the set state. That is, the one output terminal will be a logic 1 when flip-flop 32 is set and the zero output terminal will be a logic 0. When flip-flop 32 is in the reset state, the logic signals present at these two output terminals will be reversed so that the one output terminal will be a logic 0 and the zero output terminal will be a logic 1.

The logic element denoted with a reference numeral 41 is a simple OR gate. OR gate operates such that its output will be a logic 1 if any of its inputs are logic 1. Thus, OR gate 41 is a simple non-exclusive OR gate of the well known type. The logic element denoted with a reference numeral 39 is a NOR gate which means the output is a logic 0 instead of a logic 1 if any of its inputs are logic 1.

The serial in-to parallel out shift register 23 is an arrangement of cascaded stages of flip-flops of which only the input stage is steered by the data input and the subsequent stages are steered by its preceding stage. A bit clock input going to logic level 0 causes each stage to assume its steered state.

The parallel in-parallel out storage register 26 comprises a set of static latches which assume a state corresponding to the applied digital data when a logic level 1 control or load signal is applied thereto.

These logic symbols will be used throughout the description of the preferred emobodiment as set forth in FIG. 4.

Before going into a detailed description of one embodiment of the invention as set forth in FIG. 4, it may be desirable to review briefly the general functioning of this circuit arrangement. Data available from source 1 representing printable characters and control characters is applied to the shift register 23 in bit serial, character serial form and stored there under the control of a bit clock signal developed by 24 which will be described shortly. Bit clock 24 produces seven clock pulses in response to the start bit associated with the data available from source 1. Bit counter 25 counts up the seven clock pulses available on lead 100 and is used to control the transfer of the individual seven bit character signals stored in register 23 in succession to registers 26, 27 and 28 and to stop or reset the bit clock 24 to await the start bit of the next data. Clock pulses from clock 24 are related to the fixed bit rate of data available from source 1. These three last mentioned registers constitute the three character memory previously described. The execution of the printing and control functions represented by the individual character signals available at the output of register 28 in not performed by control block 4 unless a control code signal appears on lead 9' indicating that a control function is to be executed or a signal appears on lead 7 indicating that a print command is to be executed. A character signal group stored in the last stage 28 of the character memory remains there until one of two conditions develop. If all three registers 26, 27 and 28 indicate a data character stored therein, then a print command signal appears on lead 7 which in this particular embodiment causes the carriage containing the print head to start advancing across a line on the record medium. Movement of the print head continues along with related printing until either a nonprintable character or control function is detected at the output of the memory 28 or the absence of the character in this last stage is noted, as for example, if all of the characters have been printed. Thereupon the signal on 7 is removed, halting movement of the print head carriage. If the output of register 28 were a control function, then a control code would be developed on lead 9' resulting in the printer executing the related function. When this function has been executed, a data executed signal appears on lead 9. If there were no data in the output of register 28, then printing would halt and remain halted until a data character once again appeared at the output of block 28. The conditions for producing a print command on lead 7 are as follows. Where a character is sensed as being stored in the final stage of the memory, i.e. block 28, but the remaining stages of the memory, that is 26 and 27 are not both holding characters, then a timer 45 is initiated. The timer 29 is designed to produce a timing pulse after a predetermined time duration following the start of the timing sequence. This timing pulse then operates to produce a print command signal on lead 7. In one particular embodiment the predetermined time interval was selected to be 120 milliseconds. The figure of 120 milliseconds is dimensioned to be sufficiently long to enable three characters to be stored in the memory comprising registers 26, 27 and 28 but not too long to become a delay nuisance to the typist. In the situation where data is available from the source at 30 characters per second, about 66 milliseconds would be required to receive two characters which would complete the three characters stored in memory. Thus, the time delay was designed to be more than the 66 milliseconds, and 120 milliseconds was selected because of operating performance requirements. Thus, if a character is sensed in the last stage of the memory, timer 45 provides sufficient time for the earlier stages 26 and 27 to receive any new characters before producing a print command on lead 7. The end result of this arrangement is that as long as printable characters appear at the output of 28, the printer continues to print in response to carriage movement of the print head. Any time a control function character is detected, carriage movement is halted, printing stops and the control function is immediately executed. Printing is recommenced only if data appears in all three stages of the memory or the predetermined time delay has elapsed after a data character has been identified in the output stage 28. Under the circumstances previously described, the mechanism printing rate is designed to exceed the rate at which characters are normally available or received from the source 1 by a given percentage — in this case 10 percent such that the printing rate is 33 characters per second. This means that approximately 30 characters could be printed in succession before the memory comprising 26, 27 and 28 is empty of three character signals. This substantially reduces the wear caused by stopping and starting of the print head mechanism. In addition, the invention permits the machine to operate on an incremental basis, that is printing a character at a time on a stop-and-go basis depending on the data stream. The present invention also permits the execution of a control function in the middle of a data stream, followed by a continuance of the printing on the same line when the control function is executed. For example, a stream of characters could be printed, then a reader or punch could be turned on or a bell rung and then printing resumed for the balance of the line. This feature is not readily available in prior art arrangements. The printing after the control functions have been executed can occur on a continuous rate basis or a stop-and-go basis, a character at a time, depending on how the data appears or is received from the source.

For purposes of simplicity, the data source 1 is shown as supplying data bits defining individual characters over one line to shift register 23 and the start bit associated with each character signal over a separate line to the bit clock 24. Generally speaking, the data available from the source not only includes a start bit in the zero bit position but a parity bit in the eighth bit position and a stop bit in the ninth position. Circuitry exists for separating out these various bits to effect various control functions. For the purposes of simplicity in explaining this invention, however, the source is shown as furnishing its start bit over a separate line to bit clock 24, and the parity and stop bits are ignored. Thus the start bit applied to bit clock 24 produces a set of seven pulses corresponding to the seven data bits available from the data source 1. These are applied over lead 30 in serial form to the register 23 to shift in the successive data bits associated with each character into its appropriate parallel bit position. Data shifted into register 23 appears in parallel form on the seven output leads shown associated therewith, and it remains there until it is replaced with the succeeding character data being applied from data source 1. The seven data bits representing a character stored in register 23 are then applied over the parallel lines for storage in register 26 under the control of a signal developed by AND gate 31. AND gate 31 has applied to its input the output from bit counter 25, the system clock signals available on lead 8 from source 4 and the signal developed at the zero output stage of flip-flop 32. When all three inputs to AND gate 31 to to a logic level 1, the data character in register 23 is stored in register 26. Bit counter 25 produces a logic 1 when it has counted in seven data bits as established by the bit clock 24. System clock pulses at a logic level 1 in one particular embodiment occurred at 100 kilohertz rate in order to properly time and process the data stream being fed to the printing and control function execution mechanism 4. Flip-flop 32 produces a logic 1 on its zero output lead when the flip-flop 32 goes to its reset state. This occurs when a data character in 26 has been stored in a subsequent register 27, and will be described shortly. Thus, when all signal input stages to AND gate 31 go to a logic level 1, data from 23 register is stored in register 26. Bit counter 25 produces an output pulse after a count up to seven bits. This signal which contributes to the transfer of data into storage register 26 is also applied to the SS input terminal of flip-flop 32 to cause the one output terminal to go to a logic level 1 and the zero output terminal of 32 to go to zero on the occurrence of the next zero in the output form system clock 8. And gate 33 has also applied to its input a signal from the zero output terminal of flip-flop 35. The output logic level is zero for the condition where there is a data character stored in register 27. Since no character is stored in register 27, the zero output terminal is at a one state. AND gate 33 responds to the level 1 logic signals applied to its input lead to produce a logic level 1 signal for application to AND gate 34. AND gate 34 responds to the output of gate 33 and the system clock signals available from 8 to supply a logic level 1 signal to register 27 causing the data character in 26 to be applied to register 27. The logic level 1 output of gate 33 is also stored in through a feedback loop to the reset RS input terminal of flip-flop 32 restoring the one output terminal of flip-flop 32 to a zero state at the next system clock zero. The same output is applied to the SS input terminal of flip-flop 35 causing its logic level 1 output terminal to go to the logic level 1 state. In effect flip-flop 32 has been reset and flip-flop 35 has been set. In a similar manner, AND gate 36 responds to the output signal from flip-flops 35 and 38 to control AND gate 37 for loading register 28 with the data available in 27 under the control of system clock pulses available over lead 8. AND gate 36 also reset flip-flop 35 and sets flip-flop 38. Heretofore we have described how the data characters are clearly received from data source 1 and tranferred in bit parallel character serial form successively through the various stages of the memory comprising registers 26, 27 and 28. Data character stored in register 28 is next evaluated to determine whether it represents a control function or a printable character. The present invention is described for purposes of simplicity as involving data bit coding in the ASCII format. This is an American Standard Code. In this Code the control function code is recognized as containing a logic level zero in the bit 6 and 7 positions and a delete code as containing level one in all seven bit positions. NOR gate 39 responds to logic level zeros in bit 6 and 7 positions state to produce a logic level 1 at its output for application to OR gate 41. AND gate 40 responds to logic level 1 signals appearing on all seven of its inputs to produce a logic level 1 at its output. OR gate 41 responds to either of these conditions to apply a logic level 1 signal to AND gate 42. AND gate 42 also has applied to its input a signal developed at the one output terminal of flip-flop 38. This one output terminal is at a logic level 1 when final stage of the memory contains a data character stored therein. Under the circumstances therefore that a data character is stored in 28 and that either this character is a control code or a delete code, OR gate 42 responds to produce a control code signal over lead 9'. Printer 4 responds to this control code to execute the particular control function represented by the data character stored in 28. When this control function has been executed, a data executed signal is applied over lead 9 to the RS input signal of flip-flop 38 to reset flip-flop 38, removing the control code signal from lead 9' to the logic level zero appearing at the one output terminal of 38 and applied to the AND gate 42.

A printable character appearing in the output stage of register 28 is identified by neither a control code nor delete code being detected by gates 39 and 40. Under these circumstances, a logic level zero signal is developed at the output of 41 which is applied to AND gate 44 after being inverted in inverter 43. AND gate 44 responds to this logic level 1 signal and to a logic level 1 signal appearing at the one output terminal of flip-flop 38 indicating that a data character has been sensed in storage register 28 to produce a logic level 1 signal on its output lead for application to the timer 45. Timer 45 responds to the signal applied to its start terminal to begin timing out a pulse which will appear 120 milliseconds after the start of the timer. This output pulse at logic level 1 is applied to the OR gate 46. OR gate 46 responds to the output of timer 45 to apply logic level 1 signal to the SS input terminal of 47. Flip-flop 47 produces a logic level 1 signal on its one output terminal upon the occurrence of the next system clock signal applied to its T input terminal. This output from 47 applied over lead 7 causes the carriage carrying the print head to start traversing a line on the record medium. Thus, when timer 45 had timed out to produce a pulse on its output lead under the circumstances where data character has been detected in 28 and no data characters have been received into registers 26 and 27 the 120 microsecond delayed pulse delivered by timer 45 through OR gate 46 actuates print control flip-flop 47. This permits the solitary character in 28 to be printed even though there are no characters in 26 and 27. On the other hand, if registers 26 and 27 also contained characters prior to the time out of timer 45, then this would have been noted by the three input signals applied to AND gate 48 from the one output terminal of flip-flops 32, 35 and 38. Under these circumstances, OR gates 48 produces a logic level 1 signal for application to OR gate 46. OR gate 46 applies a logic level 1 signal to the SS input terminal of print control flip-flops 47 resulting in a logic level 1 signal being applied from its one output terminal to the time 45 resetting the timer to its original start position and also demanding the printer 4 to commence printer in response to the signal developed on lead 7. As each printable data character is executed by printing in block 4, a data executed signal is applied over lead 9 to the RS input terminal of flip-flop 38 resetting it. As each character available from 28 is printed, flip-flop 38 is reset permitting the next character to be moved in from the preceding storage register. This process of printing continuously proceeds until the control or delete code is detected by gate 39 or 40 or no data character is sensed in registers 27 and 28. This latter situation is sensed by the NOR gate 49. When neither the one output terminal of 38 nor the one output terminal of flip-flop 35 is in a logic 1 state indicating that a data character is stored in 27 or 28, then NOR gate 49 produces a logic level 1 signal at its output for application to OR gate 50. OR gate 50 responds to the signal from 49 for applying logic level 1 signal to the RS input terminal of flip-flop 47 resulting in a removal of the print command signal from the one lead of flip-flop 47 thereby halting printing action. OR gate 50 also responds to detection of a control or a delete code being developed by gates 39 and 40 to halt printing by removing the print command signal from lead 7.

Figures 5A, 5C:
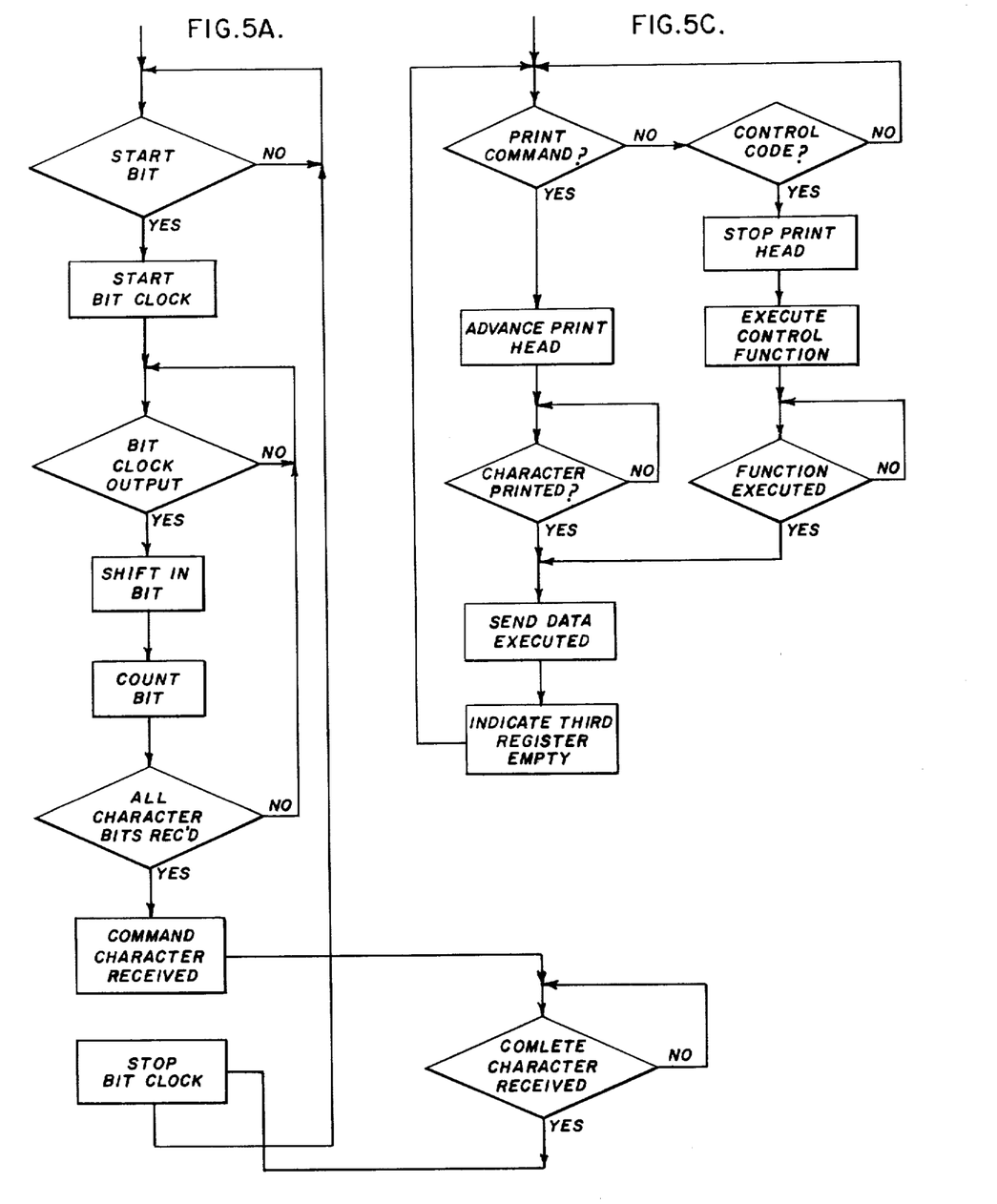

FIG. 5A illustrates graphically the functioning of the logic circuits of FIG. 4 to carry out the purposes of acquiring data into the registers by means including blocks 1, 24, 25 and 23.

Figure 5B:
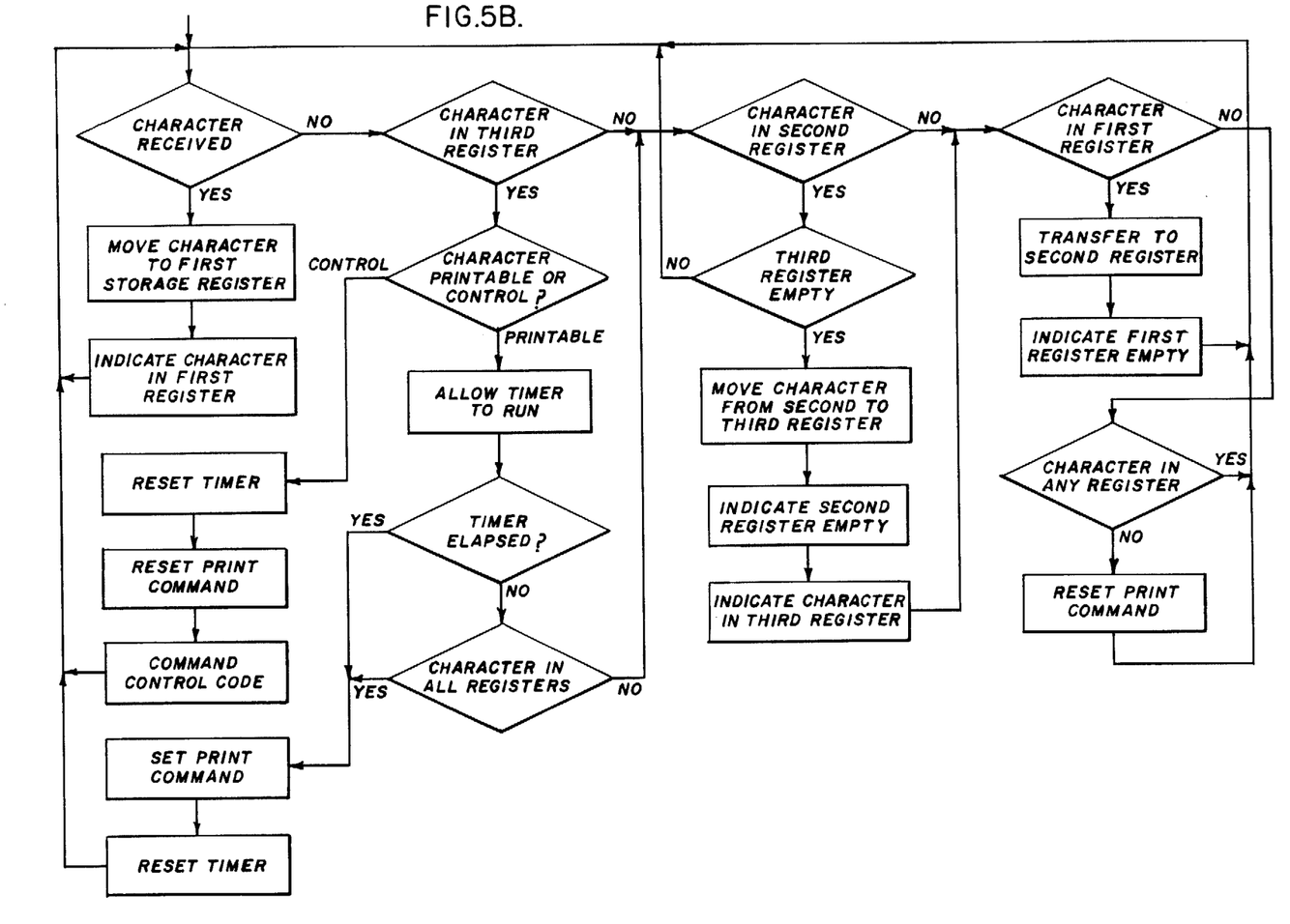

FIG. 5B illustrates graphically the functioning of the logic circuits to move data through the three storage registers to the utilization means such as a printer taking into account whether printable or control characters are involved and data contents, if any, of the storage registers.

FIG. 5C illustrates graphically the functioning of the logic circuits to control printing or the execution of control functions by the printer.

The memory may be replaced with one in which data is processed in bit serial, character serial form, as for example a circulating memory with the desired data being extracted in proper succession for controlling the operation of the printer to print characters a character at a time or to execute the related control functions. The memory may be a delay line or a shift register with the data being stored by circulation until outputted. Generally speaking, this would involve storing and shifting serially "X" number of "N" bit characters, or for example, three characters of seven bits each. The dynamic storage register would be X times N bits capacity, would receive each bit serially and circulate it for storage purposes until gated out. The number of characters in the register would be monitored and the next character to be processed by printing or executing a control function would be sensed. The method of utilizing the circulating data would be as before. If the next character to be processed is a control code, the print head would be stopped, if moving, and the control function executed. If the next character is a printable character or code, the timer would be initiated which eventually would cause this character and any successive characters to be printed if the time out occurred or when the prescribed number of characters were stored in the register. The printable characters stored and any printable characters acquired while printing would be printed until the circulating register was cleared of all characters or a control code detected.

What we claim as new and desire to secure by Letters Patent of the United States is:

1. In an arrangement wherein a printer is caused to respond to signals representing printable and control characters normally available at a first rate from a source to print the printable characters represented by said signals serially along a line on a record medium at a second rate and for executing the control functions represented by said signals, a print head for printing printable characters in response to printable character signals, means for moving said print head along a line across said record medium in a continuous fashion with controlled interruptions, means for maximizing the extend of continuous movement of said head comprising an N character signal storage register, where N is a plural number substantially less than the maximum number of characters to be printed along said line, means for receiving characters signals from said source and storing them in given locations in said storage register before utilization by said printer, means for insuring that a substantial number of characters are printed along a line before the storage register is empty of the initial N characters and the additional characters received during the printing of the initial N characters comprising said second rate being dimensioned to exceed said first rate by a relatively small percentage such that for every character printed only a fraction of the time required for a character signal to be received elapses, and means responsive to the absence of a last-stored character signal in the final stage of said register for halting said movement of said print head.

2. An arrangement according to claim 1 comprising means responsive to a control character signal appearing at a predetermined location in said register for disabling the utilization of succeeding character signals stored in said register and for disabling said moving means from moving said print head.

3. An arrangement according to claim 2 comprising means for controlling said means for moving comprising means responsive to the presence of a printable character signal in a predetermine location in said register for producing an enabling signal after a predetermined time interval and means responsive to the presence of a given plural number of character signals in said register or to said enabling signal for enabling the movement of said print head.

4. An arrangement according to claim 1 wherein said storage register is a circulating storage register and said character signals are available storage register and said character signals are available in digital form as coded bit groups, and means for circulating said character signals in bit parallel, character serial form through successive locations in said register.

5. An arrangement according to claim 1 wherein said storage register is a shift storage register and said characters are available in digital form as coded bit groups, and means for shifting said character signals in bit parallel, character serial form through successive locations in said register.

6. An arrangement according to claim 1 comprising means for sequentially selecting character signals stored in given locations in said register for utilization by said print head.

7. A printer for printing characters on a record medium in response to signals representing printable and control characters normally available at a first rate from a source comprising, means responsive to printable character signals from said source for printing the printable characters represented by said printable character signals in columns along lines on said record medium at a second rate comprising a print head, said second rate exceeding said first rate by a predetermined percentage, means for executing the control functions represented by said control character signals, drive means for normally continuously driving said print head along a line of movement across said record medium at a rate which is a function of said second rate, control means for modifying the rate of movement of said print head comprising an N character signal serial shift register for storing up to N received character signals where N is a plural number substantially less than the number of columns along a line on said record medium, means for normally serially shifting received character signals through said storage register from an input to an output stage thereof at a given clock rate substantially higher than said second rate, means responsive to a control character signal appearing at the output stage of said register for disabling the serial shifting of received character signals into the output register and for disabling said driving means from driving said print head, means responsive to the completion of the execution of the control function represented by said last-named control character signal for enabling the serial shifting of received character signals into said output register, means responsive to a printable character signal appearing at the output stage of said register for initiating the production of an enabling signal after a predetermined time interval, means for enabling said drive means to drive said print head in response to character signals being stored in all stages of said register or upon the production of said enabling signal, and means responsive to the absence of a character at the output stage of said register for disabling said driving means from driving said print head.

8. In an arrangement wherein a printer is caused to respond to signals representing printable and control characters normally available at a first rate from a source to print the printable characters represented by said signals serially along a line on a record medium at a second rate and for executing the control functions represented by said signals, a printing means for printing printable characters, means for moving said printing means along a line across said record medium in a continuous fashion with controlled interruptions, means for maximizing the extent of continuous movement of said printing means comprising an N character signal storage register, where N is a plural number substantially less than the maximum number of characters to be printed along said line, means for receiving character signals from said source and transferring them in character serial form through the successive stages of said register before application to said printing means, means for providing that a substantial number of characters may be printed along a line before the storage register is empty of the initial N characters and the additional characters received during the printing of the initial N characters, comprising said second rate being dimensioned to exceed said first rate by a relatively small percentage such that for every character printed only a fraction of the time required for a character signal to be received elapses, and means responsive to the absence of a stored character signal in a final stage of said register for stopping movement of said printing means.

9. An arrangement according to claim 8 comprising means for controlling said means for moving comprising means responsive to the presence of a printable character signal in the final stage of said register for producing an enabling signal after a predetermined time interval and means responsive to the presence of character signals in all stages of said register or to said enabling signal for initiating the movement of said printing means.

10. In an arrangement wherein a printer is caused to respond to signals representing printable and control characters normally available in digital form at a first rate from a source to print the printable characters represented by said signals serially along a line on a record medium at a second rate and for executing the control functions represented by said signals, a print head for printing printable characters in response to printable character signals,
- means for driving said print head along a line of movement across said record medium in a continuous and in an interrupted movement,
- means for maximizing the extent of continuous driving comprising a three character static shift register,
- means for receiving character signals from said source and transferring them in bit parallel, character serial form through the successive stages of said register before utilization by said printer,
- said second rate exceeding said first rate by a relatively small percentage of the order of ten percent such that for every character printed only a fraction of the time required for a character signal to be received elapses such that a substantial number of characters may be printed along a line before the shift register is empty of the initial three character signals and the additional character signals received during the printing of the initial three signals,
- and means responsive to a control character signal appearing at the final stage of said register for disabling the utilization of succeeding data stored in said register and for disabling said driving means from driving said print head.

11. An arrangement according to claim 10 comprising means responsive to the presence of a printable character signal in the final stage of said register for producing an enabling signal after a predetermined time interval,
- and means responsive to the presence of character signals in all stages of said register or to said enabling signal for enabling the driving of said print head.

12. An arrangement according to claim 11 wherein said means for transferring comprises means associated with a respective stage of said register responsive to said stage being empty of a character signal and a preceding stage of said register containing a character signal for transferring the character signal in said preceding stage to said respective stage of said register.

13. A printer for printing characters on a record medium in response to received printable character signals and control character signals normally available at a first rate from a source comprising,
- a print head responsive to received printable character signals from said source for printing the printable characters represented by said printable character signals in columns along lines on said record medium at a second rate, said second rate exceeding said first rate by a predetermined percentage,
- means for executing the control functions represented by said control character signals,
- drive means for normally continuously driving said print head along a line of movement across said record medium at a rate related to said second rate,
- control means for modifying the rate of movement of said print head comprising an N character storage register for storing up to N received character signals where N is a plural number substantially less than the number of columns along a line on said record medium,
- means responsive to received character signals for storing them in given locations in said storage register before utilization by said printer,
- means responsive to a control character signal appearing at a given location in said register for disabling the utilization of succeeding character signals stored in said register and for disabling said driving means from driving said print head,
- means responsive to the completion of the execution of the control function represented by said last-named control character signal for enabling the utilization of succeeding character signals stored in said register,
- means responsive to a printable character signal stored at a given location in said register for initiating the production of an enabling signal after a predetermined time interval,
- means for enabling said drive means to drive said print head in response to character signals being stored in a given plural number of locations in said register or upon the production of said enabling signal,
- and means responsive to the absence of a character signal at said last-named given location in said register for disabling said driving means from driving said print head.

14. Data transfer and control apparatus adapted for connection between a source delivering pulse code groups representing characters at a first maximum rate and a recorder for recording characters in serial manner at a second greater rate in intermittent continuous sequences when supplied with pulse code groups at said maximum rate from said source, a plurality of code group registers smaller in number than the number of code groups in a continuously recorded code group sequence, and control apparatus responsive to the presence of a predetermined plurality of groups stored in said registers for delivering a signal initiating recording by said data recorder and responsive to the absence of a stored group in the register adjacent said recorder for delivering a signal terminating recording by said recorder.

15. An arrangement according to claim 14 wherein said data recorder is a printer operating serially and is capable of single character start/stop printing along a line on a record medium, and said sequence represents less than a line of characters.

16. A printing arrrangement for coupling to a source serially providing coded pulse groups at a first maximum rate wherein each of said groups represents a character comprising, first means responsive to coded pulse groups provided by said source to store a plurality of such groups, means for entering each group into an input stage of said first means and for serially moving such group through said first means at a second rate, second means responsive to groups moved into a final stage of said first means for serially printing the characters corresponding to such groups at a third rate in intermittent continuous sequences comprising, the capacity of said first means for storing groups being greater than one but less than the number of coded groups printed by said second means in a continuous sequence, and said third rate being greater than said first rate but less than said second rate.

17. An arrangement according to claim 16 further comprising means responsive to the presence of a given plurality of groups stored in said first means to cause said second means to start printing characters at said third rate, and said coded pulse groups being steadily entered into and moved through said first means while said second means is printing.

18. An arrangement according to claim 17 further comprising means responsive to the presence of a group in said final stage for more than a predetermined time period to cause said second means to start printing, and means responsive to the absence of a group stored in said final stage to cause said second means to stop printing.

19. An arrangement according to claim 18 wherein said predetermined time period is greater than the time period for a plurality of pulse groups to be provided by said source.

20. An arrangement according to claim 19 wherein the groups provided by said source represent printable characters and control characters, means responsive to a group stored in said final stage representing a control character to cause said second means to stop printing and to execute the control function represented by said control character, and means responsive to the execution of said control function to cause said second means to again start printing.

21. An arrangement according to claim 16 wherein said first means comprises a three stage shift register and the groups entered into the input stage of said register are successively transferred through the remaining registers to the final stage at a substantially higher rate than said first and third rates, said second means responsive to each group entering said final stage to print steadily until all registers are empty of groups, and means responsive to the absence of a group in said final stage to stop said second means from printing.

22. An arrangement for coupling to a source, which provides coded pulse groups at a first maximum rate wherein each group represents characters, comprising an N stage register responsive to coded pulse groups provided by said source to store a plurality of such coded pulse groups, said register comprising means to accept groups at a first stage at said first rate and to transfer groups through the remaining empty stages at a second rate to a final stage, a printer, means responsive to the presence of groups stored in all stages of said register to enable said printer to print at a third rate, said third rate being slightly greater than said first rate but substantially less than said second rate, means responsive to the absence of a coded group in said final stage to cause said printer to stop printing, means responsive to a group subsequently transferred to said final stage and present therein for a period of time exceeding the period of time necessary for said source to provide N groups at said first rate to cause said printer to print the character corresponding to said last named group and to cause any next following groups to be printed until all registers are empty.

23. An arrangement according to claim 22 wherein said groups stored in said register represent printable characters and control characters and said printer responsive to a group representing a control character present in the final stage to cause said printer to stop printing and to execute the control function represented by said control characters.

24. An arrangement according to claim 23 wherein N is at least equal to 3.

25. An arrangement for coupling to a source which provides coded pulse groups each representing a character at a first maximum rate comprising, a plurality of registers responsive to coded pulse groups provided by said source to serially store and move a plurality of coded pulse groups through said registers to a final register in the order in which printing of characters corresponding to such stored groups is to take place, a printer, means responsive to the presence of a given plurality of groups stored in said registers, including a group stored in said final register, representing printable characters to cause said printer to start serially printing characters corresponding to such stored groups at a second rate, means for causing said printer to print in a continuous, intermittent sequence comprising the capacity of said registers for storing groups being smaller in number than the number of groups in a continuously printed sequence, said second rate being greater than said first rate, means for erasing stored groups in said final register in accordance with the printing of characters corresponding thereto, and means responsive to the absence of a stored group in said final register to cause said printer to stop printing.

26. An arrangement according to claim 25 further comprising means responsive to the presence of a group in said final stage representing a control character to cause said printer to stop printing and to execute the control function represented by said control character.

27. In combination, a source for delivering coded pulse groups at a first maximum rate wherein each of said groups represent a character, a register comprising a plurality of group storage stages responsive to coded pulse groups delivered by said source to store a plurality of such groups, means for entering each delivered group into an input stage of said register and for successively transferring such group through the remaining stages to an output stage at a second rate, a printer responsive to a predetermined plurality of groups stored in said register including a group stored in said output stage for printing the characters corresponding to such groups, means for causing said printer to print at a third rate in intermittent continuous sequences comprising, the capacity of said register for storing groups being greater than one but less than the number of coded groups printed by said printer in a continuous sequence, said third rate being greater than said first rate but less than said second rate, and means responsive to the absence of a group stored in said output stage of said register to block printing, and means responsive to the presence of a group stored in said output stage for longer than at least the time interval between the delivering of two successive groups by said source to cause the printer to start printing characters at said third rate.

28. In combination a source of coded pulse groups available serially at a first maximum rate wherein each of said groups represent a character, a storage shift register for storing a plurality N of coded pulse groups in respective stages thereof, means for serially applying said coded pulse groups from said source to an input stage of said register,
means for serially shifting such applied groups through the stages of said register,
means for serially applying groups shifted into an output stage of said register to a recorder for serially recording the characters represented by such applied groups at a second rate in intermittent continuous sequences wherein said second rate is greater than said first rate, means responsive to the presence of a predetermined plurality of groups stored in said register including said output stage for initiating a recording sequence comprising means for starting said recorder to record the characters represented by the groups stored in said register, means for maximizing the extent of continuous recording comprising the capacity of said register being dimensioned to be greater than one but less than the number of code group characters recorded by said recorder in a continuous sequence, said first mentioned means continuing to apply groups to such register at said first rate as said recorder records the characters represented by the groups stored in said register, means responsive to the absence of a stored group in the stage adjacent said recorder for terminating recording by said recorder, means responsive to a group stored in the output stage closest to said recorder for more than a predetermined time interval for producing an enabling signal, and means responsive to said enabling signal for starting said recorder to record the characters represented by the groups stored in said register.

29. An arrangement according to claim 28 wherein said means for serially shifting applied coded pulse groups through said register stages at a substantially higher rate than said second rate, and said predetermined time interval corresponds to the time required to store coded pulse groups in a predetermined plurality of stages of said register.

* * * * *

UNITED STATES PATENT OFFICE
CERTIFICATE OF CORRECTION

PATENT NO. : 3,957,148

DATED : May 18, 1976

INVENTOR(S) : Charles E. Milliser and David N. Sitter

It is certified that error appears in the above-identified patent and that said Letters Patent are hereby corrected as shown below:

Col. 5, line 11, cancel "thee" and insert -- the --

Col. 6, line 22, cancel "in" and insert -- is --

Col. 8, line 34, cancel "applied to" and insert -- stored in --

Col. 8, line 36, cancel "stored in" and insert -- applied --

Col. 8, line 47, cancel "reset" and insert -- resets --

Col. 10, line 68 (Claim 1), cancel "extend" and insert -- extent --

Col. 11, line 35, remove line 35; it is duplicate of portion of preceding line and portion of the next line Col. 13, line 64, cancel "prnt" and insert -- print --

Signed and Sealed this

Seventeenth Day of May 1977

[SEAL]

Attest:

RUTH C. MASON
Attesting Officer

C. MARSHALL DANN
Commissioner of Patents and Trademarks